United States Patent
Yan et al.

(10) Patent No.: US 12,326,390 B2
(45) Date of Patent: Jun. 10, 2025

(54) METHOD FOR DETERMINING BATTERY ELECTROLYTE INJECTION MASS BASED ON ELECTRODE SWELLING, FORMATION CONSUMPTION, AND INJECTION CONSUMPTION

(71) Applicants: Ningde Amperex Technology Limited, Fujian (CN); Dongguan Amperex Technology Limited, Guangdong (CN)

(72) Inventors: Dongyang Yan, Fujian (CN); Weidong Wang, Fujian (CN); Xinhui Zhou, Fujian (CN)

(73) Assignees: NINGDE AMPEREX TECHNOLOGY LIMITED, Ningde (CN); DONGGUAN AMPEREX TECHNOLOGY LIMITED, Dongguan (CN)

( * ) Notice: Subject to any disclaimer, the term of this patent is extended or adjusted under 35 U.S.C. 154(b) by 554 days.

(21) Appl. No.: 17/702,097

(22) Filed: Mar. 23, 2022

(65) Prior Publication Data

US 2022/0252498 A1  Aug. 11, 2022

Related U.S. Application Data

(63) Continuation of application No. PCT/CN2021/075542, filed on Feb. 5, 2021.

(51) Int. Cl.
*G01N 15/08* (2006.01)
*H01M 10/0525* (2010.01)
(Continued)

(52) U.S. Cl.
CPC ...... *G01N 15/088* (2013.01); *H01M 10/0525* (2013.01); *H01M 10/0568* (2013.01); *H01M 10/0569* (2013.01); *H01M 2300/0028* (2013.01)

(58) Field of Classification Search
CPC ........ H01M 10/0525; H01M 10/0568; H01M 10/0569; G01N 15/088
(Continued)

(56) References Cited

U.S. PATENT DOCUMENTS

| 2011/0250509 A1 * | 10/2011 | Yamaguchi ........... H01M 4/131 429/339 |
| 2019/0355960 A1 * | 11/2019 | Hong ................... H01M 50/119 |
| 2020/0153045 A1 * | 5/2020 | Choi ................. H01M 10/0567 |

FOREIGN PATENT DOCUMENTS

| CN | 105787140 A * | 7/2016 |
| CN | 108270034 A | 7/2018 |

(Continued)

OTHER PUBLICATIONS

International Search Report issued on Sep. 28, 2021, in corresponding International Application No. PCT/CN2021/075542, 8 pages.
(Continued)

*Primary Examiner* — Sean P Cullen
(74) *Attorney, Agent, or Firm* — Maier & Maier, PLLC

(57) ABSTRACT

A method for determining injection mass of electrolyte for a battery includes: determining a total volume $V_1$ of pores in a positive electrode active material layer, a negative electrode active material layer, and a separator of the battery; determining a volume V2 of electrolyte required by the negative electrode active material layer to ensure battery cycles; determining a volume V3 of electrolyte consumed by the battery in a formation process; determining a volume V4 of electrolyte consumed by the battery in an injection process; and determining the injection mass of electrolyte for the battery: $M_{EI}=(V_1+V_2+V_3+V_4)\times\rho_{EI}$. The injection mass of electrolyte for the battery is closer to actual optimal injection mass, which improves the accuracy of the electrolyte injection process, provides better electrochemical per-
(Continued)

formance of the battery, and lowers the research and development costs of the battery.

10 Claims, 7 Drawing Sheets

(51) Int. Cl.
*H01M 10/0568* (2010.01)
*H01M 10/0569* (2010.01)

(58) Field of Classification Search
USPC .............................. 429/51, 91, 331, 332, 334
See application file for complete search history.

(56) References Cited

FOREIGN PATENT DOCUMENTS

| | | | | | |
|---|---|---|---|---|---|
| CN | 109802089 | A | | 5/2019 | |
| CN | 109920970 | A | | 6/2019 | |
| CN | 110487367 | A | | 11/2019 | |
| CN | 111463398 | A | | 7/2020 | |
| CN | 111740168 | A | * | 10/2020 | ........ H01M 10/0587 |
| CN | 111785910 | A | | 10/2020 | |
| KR | 2017063250 | A | * | 6/2017 | .......... H01M 10/058 |

OTHER PUBLICATIONS

Extended European Search Report issued on Sep. 3, 2024, in corresponding European Application No. 21923770.8, 5 pages.
Office Action issued on Apr. 27, 2022, in corresponding Chinese Application No. 202180001815.X, 12 pages.

* cited by examiner

METHOD FOR DETERMINING BATTERY ELECTROLYTE INJECTION MASS BASED ON ELECTRODE SWELLING, FORMATION CONSUMPTION, AND INJECTION CONSUMPTION

CROSS-REFERENCE TO RELATED APPLICATIONS

The present application is a national phase application of PCT application PCT/CN2021/075542, filed on Feb. 5, 2021, the disclosure of which is hereby incorporated by reference in its entirety.

TECHNICAL FIELD

This application relates to the field of electrochemical technologies, and in particular, to a method for determining injection mass of electrolyte for a battery.

BACKGROUND

Lithium-ion batteries feature high specific energy, high working voltage, low self-discharge rate, small size, light weight, and the like, and are widely applied in fields such as electrical energy storage, portable electronic devices, and electric vehicles.

Electrolyte is one of the important factors that affect the performance of a lithium-ion battery. Therefore, it is necessary to accurately determine mass of electrolyte that needs to be injected into the lithium-ion battery during manufacture of the lithium-ion battery, so as to optimize the performance of the lithium-ion battery. In an existing method for determining injection mass of electrolyte for a lithium-ion battery, typically, different amounts of electrolyte are injected into lithium-ion batteries that have not undergone injection, and then various performance test experiments are performed on the lithium-ion batteries with different amounts of electrolyte, and an optimal electrolyte injection mass is determined based on the experimental results. However, the above method usually takes 3 to 6 months, and therefore the experiment cycle is long, the efficiency is low, and battery preparation materials are consumed, which leads to high research and development costs.

SUMMARY

An objective of this application is to provide a method for determining injection mass of electrolyte for a battery, so as to improve the efficiency and accuracy of determining the injection mass for the battery. Specific technical solutions are as follows.

According to a first aspect of this application, a method for determining injection mass of electrolyte for a battery is provided, where the method includes:

determining a total volume $V_1$ of pores in a positive electrode active material layer, a negative electrode active material layer, and a separator of the battery;

determining a volume $V_2$ of electrolyte required by the negative electrode active material layer to ensure battery cycles, where $$V_2 = V_{negative\ electrode\ active\ material\ layer} \times \alpha$$

where $V_{negative\ electrode\ active\ material\ layer}$ is an apparent volume of the negative electrode active material layer, and $\alpha$ is a swelling percentage of the negative electrode active material layer;

determining a volume $V_3$ of electrolyte consumed by the battery in a formation process;

determining a volume $V_4$ of electrolyte consumed by the battery in an injection process; and determining the injection mass of electrolyte for the battery: $M_{EI} = (V_1 + V_2 + V_3 + V_4) \times \rho_{EI}$ where $M_{EI}$ is the injection mass of electrolyte for the battery, and $\rho_{EI}$ is density of the electrolyte.

In an embodiment of this application, $V_3$ is determined by using the following formula:

$$V_3 = \beta \times [V_{positive\ electrode\ active\ material\ layer} \times (1 - A_1) + V_{negative\ electrode\ active\ material\ layer} \times (1 - A_2)]$$

where $A_1$ is a first cycle efficiency of the positive electrode active material layer, $A_2$ is a first cycle efficiency of the negative electrode active material layer, $\beta$ is a consumption coefficient in formation, and $V_{positive\ electrode\ active\ material\ layer}$ is an apparent volume of the positive electrode active material layer.

In an embodiment of this application, $V_4$ is determined by using the following formula:

$$V_4 = m_c / \rho_{EI}$$

where $m_c$ is a mass of electrolyte consumed by the battery in the injection process.

In an embodiment of this application, $\alpha$ ranges from 5% to 15%.

In an embodiment of this application, $\beta$ is determined by using the following formula:

$$\beta = \frac{\Delta X}{m_1}$$

where $\Delta X$ is a difference between mass before and mass after formation of the battery, and $m_1$ is a mass of electrolyte in the battery before the formation.

In an embodiment of this application, $m_c$ ranges from 0.05 g to 0.6 g.

In an embodiment of this application, the electrolyte includes a cyclic carbonate compound, a linear ester compound, and a nitrile compound. In an embodiment of this application, based on a total mass of the electrolyte, a mass percentage of the cyclic carbonate compound ranges from 20% to 70%, a mass percentage of the linear ester compound ranges from 10% to 40%, and a mass percentage of the nitrile compound ranges from 1% to 15%.

In an embodiment of this application, the cyclic carbonate compound includes at least one of ethylene carbonate, propylene carbonate, diethyl carbonate, butylene carbonate, dimethyl carbonate, ethyl methyl carbonate, or methyl propyl carbonate; the linear ester compound includes at least one of propyl propionate, ethyl propionate, methyl acetate, ethyl acetate, propyl acetate, methyl propionate, methyl butyrate, ethyl butyrate, γ-butyrolactone, or δ-valerolactone; and the nitrile compound includes at least one of acetonitrile, succinonitrile, adiponitrile, glutaronitrile, hexanetricarbonitrile, trans-hexenedinitrile, ethylene glycol bis(propionitrile) ether, or hexafluorocyclotriphosphazene.

In an embodiment of this application, the cyclic carbonate compound includes ethylene carbonate, propylene carbonate, and diethyl carbonate; the linear ester compound includes propyl propionate and ethyl propionate; and the nitrile compound includes acetonitrile, where a mass ratio of the ethylene carbonate to the propylene carbonate to the diethyl carbonate is 1:1:1-2, and a mass ratio of the propyl propionate to the ethyl propionate is 1:1-2.

This application provides the method for determining injection mass of electrolyte for a battery. In determining the injection mass of electrolyte, a total volume of pores in the positive electrode active material layer, the negative electrode active material layer, and the separator, a volume of electrolyte required by the negative electrode active material layer to ensure battery cycles, a volume of electrolyte consumed by the battery in a formation process, and a volume of electrolyte consumed by the battery in the injection process are fully considered. Therefore, the determined injection mass of electrolyte is closer to actual optimal injection mass, which improves the accuracy of the electrolyte injection process. Moreover, compared with a method for determining optimal injection mass based on performance tests on batteries with different amounts of electrolyte injected, this application reduces the time cost and material cost consumed in a long-term experiment process, improves the efficiency of determining the injection mass for a battery, provides better electrochemical performance of the battery, and lowers the research and development costs of the battery.

BRIEF DESCRIPTION OF DRAWINGS

To describe the technical solutions in this application and in the prior art more clearly, the following briefly describes the accompanying drawings required for describing the embodiments and the prior art. Apparently, the accompanying drawings in the following description show merely some embodiments of this application.

DETAILED DESCRIPTION

To make the objectives, technical solutions, and advantages of this application clearer, this application is further described in detail with reference to the accompanying drawings and embodiments. Apparently, the described embodiments are merely some rather than all of the embodiments of this application.

Figure 1:
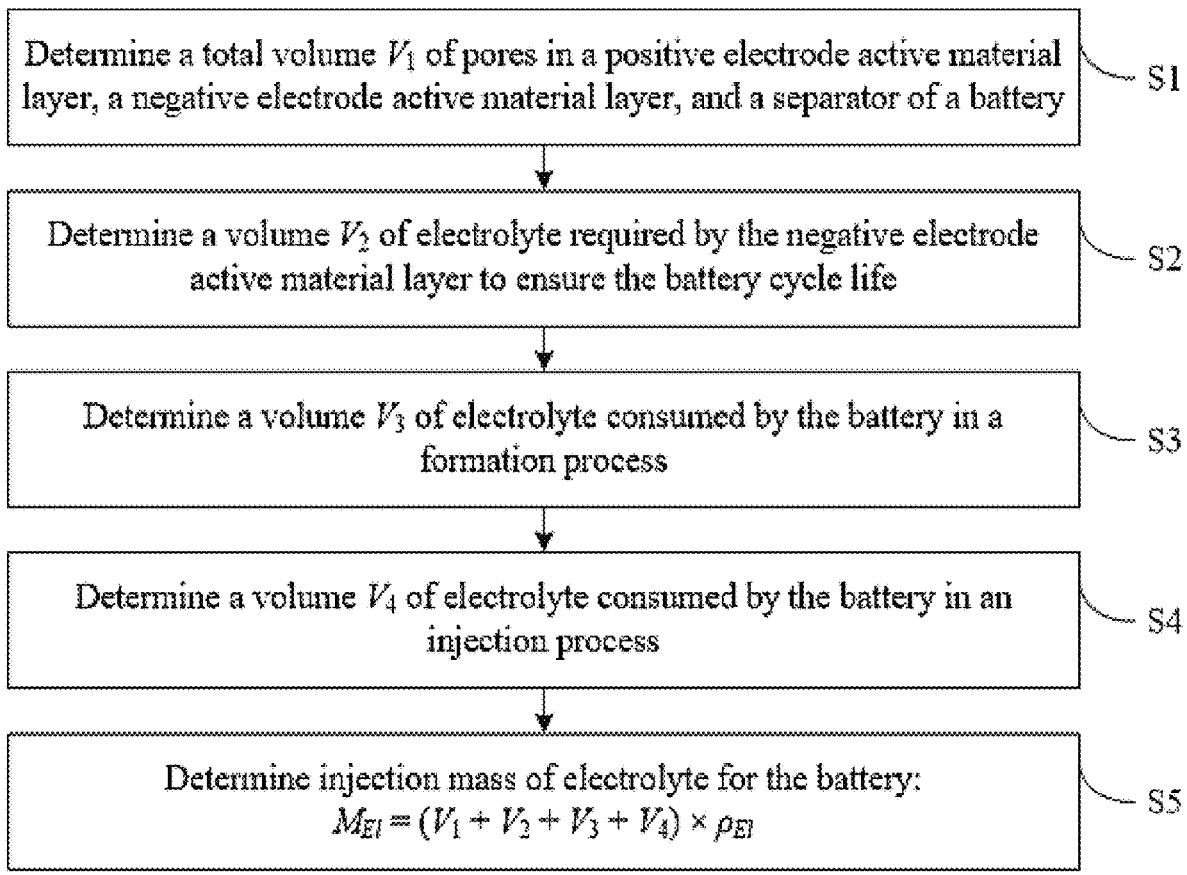
FIG. 1 is a flowchart a method for determining injection mass of electrolyte for a battery according to this application.

In an implementation scheme, the amount of electrolyte that should be injected may be calculated based on the physical consumption of electrolyte, but such method still has a problem of large deviation between the calculated injection mass and actual optimal injection mass of electrolyte. In view of this, this application provides a method for determining injection mass of electrolyte for a battery, as shown in FIG. 1. The method includes the following steps.

S1: Determine a total volume $V_1$ of pores in a positive electrode active material layer, a negative electrode active material layer, and a separator of the battery.

In this application, the physical filling of electrolyte inside the battery is considered in determining the injection mass of electrolyte, to ensure that the pores in the positive electrode active material layer, the negative electrode active material layer, and the separator are fully filled with the electrolyte, so that the electrolyte plays a role in the transfer of lithium ions. If some positions of the positive electrode active material layer, the negative electrode active material layer, and the separator cannot be filled with electrolyte, the positions that are not filled with electrolyte cannot contribute to capacity, resulting in poor electrolyte infiltration of the battery.

Generally, the electrolyte enters the pores of the positive electrode active material layer, the negative electrode active material layer, and the separator for physical filling. Therefore, a porosity of the positive electrode active material layer, the negative electrode active material layer, and the separator may be determined, then a total volume $V_1$ of the pores in the positive electrode active material layer, the negative electrode active material layer, and the separator is determined, and thereby the mass of electrolyte required to fill the positive electrode active material layer, the negative electrode active material layer, and the separator is determined.

S2: Determine a volume $V_2$ of electrolyte required by the negative electrode active material layer to ensure battery cycles, where $$V_2 = V_{negative\ electrode\ active\ material\ layer} \times \alpha$$

where $V_{negative\ electrode\ active\ material\ layer}$ is an apparent volume of the negative electrode active material layer, and $\alpha$ is a swelling percentage of the negative electrode active material layer.

The battery is usually a secondary battery that can be cyclically charged and discharged, and it is therefore required that the battery can be used normally during its cycle life. During the battery cycle life, the negative electrode active material layer of the battery is subjected to cyclic intercalation and deintercalation of lithium ions, which causes volume swelling of the negative electrode active material layer. Different from a porosity of the negative electrode active material layer of the battery in the early stage of manufacturing, the porosity of the negative electrode active material layer increases in the late stage of cycling, resulting in a larger physical demand for the electrolyte. Therefore, in this application, the consumption of electrolyte caused by the swelling of the negative electrode active material layer in the late stage of cycling of the battery is further considered, which ensures that in the late stage of cycling, no capacity loss occurs due to local dead zones caused by the electrolyte not enough to fill all pores of the negative electrode active material layer. The swelling percentage $\alpha$ of the negative electrode active material layer in this application may be determined according to swelling characteristics of different negative electrode active material layers in the cycle life, and the value usually ranges from 5% to 15%.

S3: Determine a volume $V_3$ of electrolyte consumed by the battery in a formation process.

The positive electrode plate and the negative electrode plate in the battery undergo film forming reactions in the first formation process. To be specific, reactions with electrolyte components on surfaces of the positive electrode plate and the negative electrode plate occur, forming a complex organic-inorganic hybrid component to prevent the electrode plates from a side reaction and protect the electrode plates. In this application, the chemical consumption of electrolyte by the battery in a formation process is considered, that is, the volume $V_3$ consumed by electrochemical reactions between the electrolyte and the positive electrode active material in the positive electrode plate and between the electrolyte and the negative electrode active material in the negative electrode plate is considered.

S4: Determine a volume $V_4$ of electrolyte consumed by the battery in an injection process.

In the injection process of the battery, due to other factors, the electrolyte is consumed to some extent. The foregoing other factors are mainly loss of injected electrolyte in the manufacturing process, and are usually determined depending on different production lines and different production processes. In this application, the different production lines may mainly refer to production lines equipped with injection devices, formation devices, degassing devices, weighing devices, and packaging devices with different models and different precisions, which have impact on a total injection tolerance and a total injection loss. The different production processes mainly refer to processes such as an injection process, a formation process, a degassing process, and a packaging process, with adjustment of parameters such as temperature, humidity, and vacuum degree, which have impact on a total injection tolerance and a total injection loss. In this application, the consumption of electrolyte due to other factors in the injection process is considered, so that the determined injection mass of electrolyte is more accurate.

S5: Determine the injection mass of electrolyte for the battery: $M_{El}=(V_1+V_2+V_3+V_4) \times \rho_{El}$.

In this application, after the foregoing $V_1$, $V_2$, $V_3$, and $V_4$ are determined, the injection mass of electrolyte can be determined according to the density of the electrolyte. $M_{El}$ is the injection mass of electrolyte for the battery, and $\rho_{El}$ is density of the electrolyte.

It should be noted that a sequence of the foregoing steps S1 to S4 is not particularly limited in this application as long as $V_1$, $V_2$, $V_3$, and $V_4$ can be determined in steps S1, S2, S3, and S4, respectively.

In an embodiment of this application, $V_1$ can be determined by using the following formula:

$$V_1 = V_{positive\ electrode\ pores} + V_{negative\ electrode\ pores} + V_{separator\ pores}$$

where $V_{positive\ electrode\ pores}$ is a total volume of pores in the positive electrode active material layer; $V_{negative\ electrode\ pores}$ is a total volume of pores in the negative electrode active material layer; and $V_{separator\ pores}$ is a total volume of pores in the separator.

In an embodiment of this application, $V_{positive\ electrode\ pores}$ can be determined by using the following formula:

$$V_{positive\ electrode\ pores} = S_{positive\ electrode\ active\ material\ layer} \times V_{positive\ electrode\ active\ material\ layer}$$

where $S_{positive\ electrode\ active\ material\ layer}$ is a porosity of the positive electrode active material layer, and $V_{positive\ electrode\ active\ material\ layer}$ is an apparent volume of the positive electrode active material layer.

$V_{negative\ electrode\ pores}$ is determined by using the following formula:

$$V_{negative\ electrode\ pores} = S_{negative\ electrode\ active\ material\ layer} \times V_{negative\ electrode\ active\ material\ layer}$$

where $S_{negative\ electrode\ active\ material\ layer}$ is a porosity of the negative electrode active material layer, and $V_{negative\ electrode\ active\ material\ layer}$ is an apparent volume of the negative electrode active material layer.

$V_{separator\ pores}$ is determined by using the following formula:

$$V_{separator\ pores} = S_{separator} \times V_{separator}$$

where $S_{separator}$ is a porosity of the separator, and $V_{separator}$ is an apparent volume of the separator.

In an embodiment of this application, the volume $V_3$ of electrolyte consumed by the battery in the formation process is determined by using the following formula:

$$V_3 = \beta \times [V_{positive\ electrode\ active\ material\ layer} \times (1-A_1) + V_{negative\ electrode\ active\ material\ layer} \times (1-A_2)]$$

where $A_1$ is first cycle efficiency of the positive electrode active material layer, $A_2$ is first cycle efficiency of the negative electrode active material layer, and $\beta$ is a consumption coefficient in formation.

In this application, the consumption of electrolyte by the positive electrode active material layer and the negative electrode active material layer after the first charge and discharge process is considered, and the consumption is a loss of battery capacity. Therefore, for the positive electrode active material layer, the first cycle efficiency $A_1$ of the positive electrode active material layer is a remaining capacity percentage after the battery is chemically converted, and a volume loss of the positive electrode active material layer can be calculated by using the expression $V_{positive\ electrode\ active\ material\ layer} \times (1-A_1)$. For the negative electrode active material layer, the first cycle efficiency $A_2$ of the negative electrode active material layer is a remaining capacity percentage after the battery is chemically converted, and a volume loss of the negative electrode active material layer can be calculated by using the expression $V_{negative\ electrode\ active\ material\ layer} \times (1-A_2)$. However, a first cycle efficiency loss of the positive electrode active material layer or the negative electrode active material layer is not caused only by a surface area or volume loss of an active material, but also includes a capacity loss caused by a surface composition change and a phase change of the electrode active material itself. Based on this, to correct the deviation of this part, in this application, the consumption coefficient β in formation is considered, and this value can be determined through consumption experiments in formation of a chemical system.

In an embodiment of this application, the consumption coefficient in formation is determined by using the following formula:

$$\beta = \frac{\Delta X}{m_1}$$

where $\Delta X$ is a difference between mass before and mass after the formation of the battery, and $m_1$ is mass of electrolyte in the battery before the formation.

During the consumption experiments in the formation of the chemical system, an excessive electrolyte of the mass $m_1$ may be injected into a battery that no electrolyte has been injected into, and the battery is weighed to obtain first mass $m_x$.

The formation process is performed on the battery after the injection. After the formation, gases generated in the battery are removed, and the battery is weighed again to obtain second mass $m_y$.

β can be obtained by calculating $\Delta X = m_x - m_y$.

In an embodiment of this application, the volume V4 of electrolyte consumed by the battery in the injection process may be determined by using the following formula:

$$V_4 = m_c / \rho_{El}$$

where $m_c$ is mass of electrolyte consumed by the battery in the injection process.

In an embodiment of this application, the mass $m_c$ of electrolyte consumed ranges from 0.05 g to 0.6 g.

In an embodiment of this application, the electrolyte includes a cyclic carbonate compound, a linear ester compound, and a nitrile compound. The cyclic carbonate compound has good ion dissociation and electrolyte infiltration capabilities, the linear ester compound has a high conductivity, and the nitrile compound can improve the SEI film forming of the positive electrode active material layer and the negative electrode active material layer.

In an embodiment of this application, based on a total mass of the electrolyte, a mass percentage of the cyclic carbonate compound ranges from 20% to 70%, a mass percentage of the linear ester compound ranges from 10% to 40%, and a mass percentage of the nitrile compound ranges from 1% to 15%.

In this application, controlling the mass percentage of the cyclic carbonate compound within the foregoing range can improve the ion dissociation and infiltration of the electrolyte; controlling the mass percentage of the linear ester compound within the foregoing range can improve the conductivity of the electrolyte, prevent lithium precipitation due to the excessive polarization of some positions of the electrode plates, ensure that the battery has no obvious interface defects after long cycles, and prolong the lifespan of the battery; and controlling the mass percentage of the nitrile compound within the foregoing range can maintain storage requirements in the battery cycle life, avoid repeated consumption of electrolyte caused by the breakage and regeneration of the protective film of the positive electrode active material layer and the negative electrode active material layer, and improve the long-term storage stability of the battery.

The cyclic carbonate compound, the linear ester compound, and the nitrile compound are not particularly limited in this application as long as requirements of this application can be met. In addition to the foregoing cyclic carbonate compound, linear ester compound, and nitrile compound, the electrolyte may further include other compounds, for example, including but not limited to: at least one of a carboxylic acid ester compound, an ether compound, or another organic solvent.

In an embodiment of this application, the cyclic carbonate compound includes at least one of ethylene carbonate, propylene carbonate, diethyl carbonate, butylene carbonate, dimethyl carbonate, ethyl methyl carbonate, or methyl propyl carbonate;

the linear ester compound includes at least one of propyl propionate, ethyl propionate, methyl acetate, ethyl acetate, propyl acetate, methyl propionate, methyl butyrate, ethyl butyrate, γ-butyrolactone, or δ-valerolactone; and the nitrile compound includes at least one of acetonitrile, succinonitrile, adiponitrile, glutaronitrile, hexanetricarbonitrile, trans-hexenedinitrile, ethylene glycol bis(propionitrile) ether, or hexafluorocyclotriphosphazene. In an embodiment of this application, the hexanetricarbonitrile may be 1,3,6-hexanetricarbonitrile.

In an embodiment of this application, the cyclic carbonate compound includes ethylene carbonate, propylene carbonate, and diethyl carbonate; the linear ester compound includes propyl propionate and ethyl propionate; and the nitrile compound includes acetonitrile, where a mass ratio of the ethylene carbonate to the propylene carbonate to the diethyl carbonate is 1:1:1-2, and a mass ratio of the propyl propionate to the ethyl propionate is 1:1-2. The electrolyte including the foregoing components and contents can further improve the ion dissociation and infiltration of the electrolyte and the long-term storage stability.

The positive electrode active material layer in this application is not particularly limited as long as the objective of this application can be achieved. For example, the positive electrode active material layer includes a positive electrode active material. The positive electrode active material is not particularly limited, and any positive electrode active material known in the art may be used, for example, including at least one of lithium nickel cobalt manganate (811, 622, 523, 111), lithium nickel cobalt aluminate, lithium iron phosphate, a lithium-rich manganese-based material, lithium cobaltate, lithium manganate, lithium manganese iron phosphate, or lithium titanate.

The negative electrode active material layer in this application is not particularly limited as long as the objective of this application can be achieved. For example, the negative electrode active material layer includes a negative electrode active material. The negative electrode active material is not particularly limited, and any negative electrode active material known in the art may be used, for example, including at least one of artificial graphite, natural graphite, mesocarbon microbeads, soft carbon, hard carbon, silicon, silicon carbon, a titanium niobium compound, lithium titanate, or the like.

The separator in this application includes, but is not limited to, at least one selected from polyethylene, polypropylene, polyethylene terephthalate, polyimide, or aramid. For example, polyethylene includes at least one component selected from high-density polyethylene, low-density polyethylene, or ultra-high molecular weight polyethylene. Particularly, polyethylene and polypropylene have a good effect on preventing short circuits, and can improve the stability of a lithium-ion battery through the shutdown effect.

A surface of the separator may further include a porous layer, the porous layer is provided on at least one surface of the separator, and the porous layer includes inorganic particles and a binder. The inorganic particles are selected from one or more of aluminum oxide ($Al_2O_3$), silicon oxide ($SiO_2$), magnesium oxide (MgO), titanium oxide ($TiO_2$), hafnium dioxide ($HfO_2$), tin oxide ($SnO_2$), cerium dioxide ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide, or barium sulfate. The binder is selected from one or more of polyvinylidene fluoride, vinylidene fluoride-hexafluoropropylene copolymer, polyamide, polyacrylonitrile, polyacrylate, polyacrylic acid, polyacrylate, sodium carboxymethylcellulose, polyvinylpyrrolidone, polyvinyl ether, polymethyl methacrylate, polytetrafluoroethylene, or polyhexafluoropropylene.

The porous layer can improve the heat resistance, oxidation resistance, and electrolyte infiltration performance of the separator, and enhance the bonding performance between the separator and the positive electrode or the negative electrode.

The procedure for preparing a battery is well known to those skilled in the art, and is not particularly limited in this application. For example, a lithium-ion battery may be prepared through the following procedure: A positive electrode and a negative electrode are separated by a separator and stacked, and after being wound, folded, or the like as needed, they are placed into a housing that is sealed after electrolyte is injected. In addition, an overcurrent protection element, a guide, or the like may further be placed in the housing as needed, so as to prevent a pressure inside the lithium-ion battery from rising too high, and the lithium-ion battery from over-charging and over-discharging.

The battery is not particularly limited in this application, for example, may be a primary battery, a secondary battery, a fuel cell, a solar cell, or a capacitor. A typical battery is a lithium-ion battery, which is a secondary battery. The lithium-ion battery usually includes a negative electrode plate, a positive electrode plate, a separator, and an electrolyte.

The procedure for preparing an electrolyte is not particularly limited in this application. For example, the electrolyte may be prepared through the following procedure: Various raw material components constituting the electrolyte are mixed in a ratio and stirred thoroughly to obtain the electrolyte.

EXAMPLES

In the following, examples and comparative examples are given to describe the implementation of this application in more detail. Various tests and evaluations were performed according to the following methods.

Test Method and Device:
Porosity Test:

Samples of a positive electrode active material layer, a negative electrode active material layer, or a separator with given mass (for example, 10 g) were weighed and placed in a true density analyzer (with the model of AccuPycII), the test system was kept airtight, and then nitrogen was introduced into the test system. Based on gas pressures in a sample chamber and an expansion chamber, the true density analyzer calculated a true volume of pores of the samples and a corresponding porosity value according to Boyle's law ($PV=nRT$).

Example 1

Battery dimensions: 4.29 mm (thickness)×44.14 mm (width)×83.79 mm (length); cut-off voltage: 4.45 V; and battery capacity: 2719 mAh.

<1-1. Preparation of a Positive Electrode Plate>

Lithium cobaltate as a positive electrode active material, acetylene black, and polyvinylidene fluoride (PVDF) were mixed at a mass ratio of 94:3:3, and then N-methylpyrrolidone (NMP) was added as a solvent to prepare a slurry with a solid content of 75%. The slurry was stirred well. The slurry was uniformly applied on one surface of aluminum foil with a thickness of 12 μm, and dried at 90° C. The aluminum foil was cold pressed to obtain a positive electrode plate having a positive electrode active material layer with a thickness of 100 μm. Then the foregoing steps were repeated on the other surface of the positive electrode plate to obtain a positive electrode plate coated with positive electrode active material layers on both surfaces. The positive electrode plate was welded with a tab and left for later use.

<1-2. Preparation of a Negative Electrode Plate>

Artificial graphite as a negative electrode active material, acetylene black, styrene-butadiene rubber, and sodium carboxymethyl cellulose were mixed at a mass ratio of 96:1:1.5:1.5, and then deionized water was added as a solvent to prepare a slurry with a solid content of 70%. The slurry was stirred well. The slurry was uniformly applied on one surface of copper foil with a thickness of 8 μm, and dried at 110° C. The copper foil was cold pressed to obtain a negative electrode plate having a negative electrode active material layer with a thickness of 150 μm. Then the foregoing coating steps were repeated on the other surface of the negative electrode plate, and a negative electrode plate coated with negative electrode active material layers on both surfaces was obtained. The negative electrode plate was welded with a tab and left for later use.

<1-3. Preparation of a Separator>

Alumina and polyacrylate were mixed at a mass ratio of 90:10 and dissolved in deionized water to form a ceramic slurry with a solid content of 50%. Subsequently, the ceramic slurry was uniformly applied on one surface of a porous substrate (polyethylene with a thickness of 7 μm, an average pore diameter of 0.073 μm, and a porosity of 26%) by using a micro-gravure coating method, and dried to obtain a double-layer structure having a ceramic coating and a porous substrate.

Polyvinylidene fluoride and polyacrylate were mixed at a mass ratio of 96:4 and dissolved in deionized water to form a polymer slurry with a solid content of 50%. Subsequently, the polymer slurry was uniformly applied on two surfaces of the foregoing double-layer structure having the ceramic coating and the porous substrate by using the micro-gravure coating method, and dried to obtain a separator.

Parameters and calculation results of the injection mass of electrolyte are shown in Table 1-1 to Table 1-5

TABLE 1-1

| Battery part | Porosity | Length (mm) | Width (mm) | Thickness (mm) | Volume (mm$^3$) | Pore volume (mm$^3$) | $V_1$ (mm$^3$) |
|---|---|---|---|---|---|---|---|
| Negative electrode active material layer | 31.0% | 1250.5 | 78.033 | 0.06 | 5854.816 | 1814.993 | 2960.181 |
| Positive electrode active material layer | 19.7% | 1235 | 76.841 | 0.044 | 4175.540 | 822.581 | |
| Separator | 27.3% | 1464 | 80.733 | 0.01 | 1181.931 | 322.667 | |

TABLE 1-2

| α | Negative electrode active material layer volume (mm$^3$) | $V_2$ (mm$^3$) |
|---|---|---|
| 9.2% | 5854.816 | 538.643 |

TABLE 1-3

| Battery part | First cycle efficiency | β | Volume (mm$^3$) | Volume consumed in formation (mm$^3$) | $V_3$ (mm$^3$) |
|---|---|---|---|---|---|
| Negative electrode active material layer | 92.1% | 0.4 | 5854.816 | 462.530 | 276.874 |
| Positive electrode active material layer | 94.5% | | 4175.540 | 229.656 | |

TABLE 1-4

| Battery part | $m_c$ (g) | $V_4$ (mm$^3$) |
|---|---|---|
| Battery | 0.15 | 130.434 |

TABLE 1-5

| $V_1 + V_2 + V_3 + V_4$ (mm$^3$) | $\rho_{El}$ (g/cm$^3$) | $M_{El}$ (g) |
|---|---|---|
| 3906.132 | 1.15 | 4.49 |

The electrolyte was injected into the battery according to the determined injection mass $M_{El}$. In the electrolyte, a mass percentage of the cyclic carbonate compound was 45%, a mass percentage of the linear ester compound was 40%, and a mass percentage of the nitrile compound was 15%. The cyclic carbonate compound included ethylene carbonate, propylene carbonate, and diethyl carbonate (in a mass ratio of 1:1:1), and the linear ester compounds included propyl propionate and ethyl propionate (in a mass ratio of 1:1), and the nitrile compound was acetonitrile.

A 25° C. cycling test was performed on the battery by using the following method:

Charging Mode:

The battery was charged at a constant current of 1.3 C to 4.1 V, then charged at a constant voltage to a current of 1.0 C, then charged at a constant current of 1.0 C to a voltage of 4.2 V, then charged at a constant voltage to a current of 0.7 C, then charged at a constant current of 0.7 C to a voltage of 4.3 V, then charged at a constant voltage to a current of 0.4 C, then charged at a constant current of 0.4 C to a voltage of 4.45 V, and then charged at a constant voltage to a current of 0.025 C. Herein, 1 C is calculated according to the formula as follows: 1 C (A)=Capacity (A·h)/Discharge time (1 h), where the capacity is a shipment typical capacity of the battery, and the discharge time is 1 h. Unless otherwise specified, the definition of 1 C applies throughout the description.

Discharging Mode:

In the $1^{st}$, $49^{th}$, $99^{th}$, $149^{th}$, $199^{th}$, $249^{th}$, . . . , and $999^{th}$ cycles, the battery was discharged at 0.2 C to a voltage of 3.0 V.

In the $2^{nd}$ to $48^{th}$, $50^{th}$ to $98^{th}$, $100^{th}$ to $148^{th}$, $150^{th}$ to $198^{th}$, . . . , $950^{th}$ to $998^{th}$, and $1000^{th}$ cycles, the battery was discharged at 0.5 C to a voltage of 3.2 V.

During the cycling, a micrometer was used to measure thicknesses of the fully charged battery in the $1^{st}$, $50^{th}$, $100^{th}$, $150^{th}$, $200^{th}$, . . . , and $1000^{th}$ cycling tests.

Figure 2:
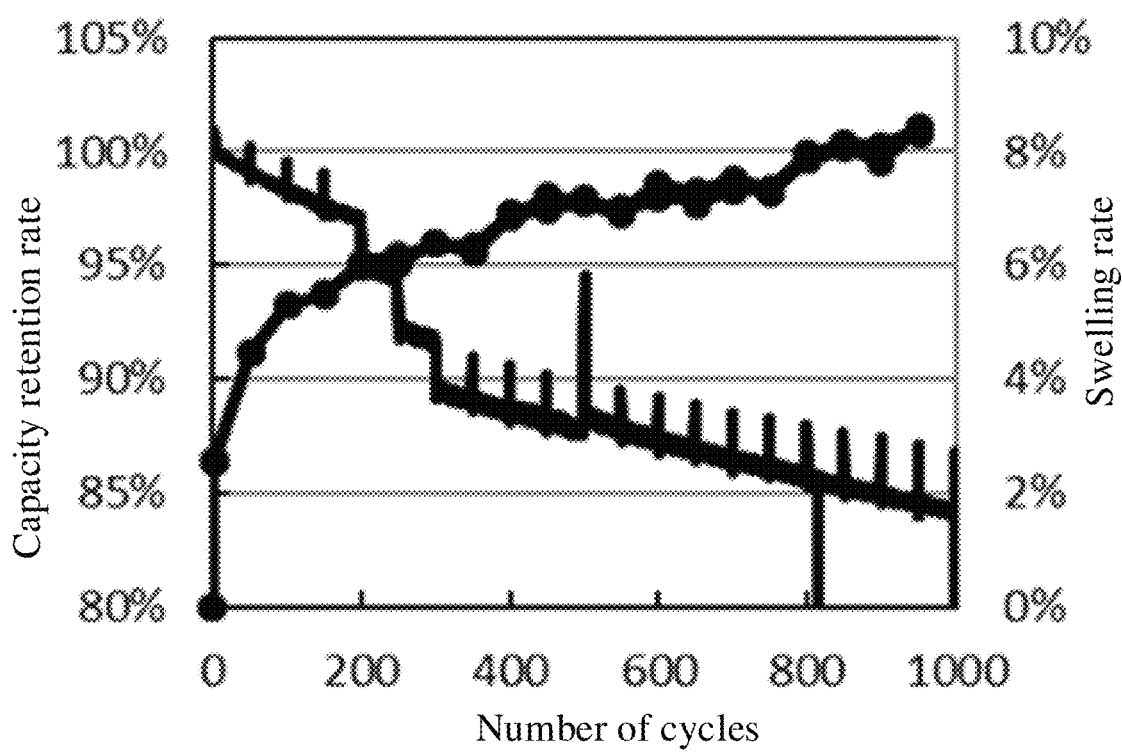
FIG. 2 shows a performance test result of a battery at 25° C. in Example 1 of this application.

Cycling test results of the battery at 25° C. are shown in FIG. 2.

Example 2

Battery dimensions: 5.06 mm (thickness)×56.53 mm (width)×74.3 mm (length); cut-off voltage: 4.43 V; and battery capacity: 3720 mAh.

During the preparation of the battery, the preparation processes of <Preparation of a positive electrode plate>, <Preparation of a negative electrode plate>, and <Preparation of a separator> were the same as those in Example 1.

Parameters and calculation results of the injection mass of electrolyte are shown in Table 2-1 to Table 2-5

TABLE 2-1

| Battery part | Porosity | Length (mm) | Width (mm) | Thickness (mm) | Volume (mm³) | Pore volume (mm³) | $V_1$ (mm³) |
|---|---|---|---|---|---|---|---|
| Negative electrode active material layer | 33.0% | 1928.7 | 68.4 | 0.0555 | 7321.731 | 2416.171 | 3921.602 |
| Positive electrode active material layer | 21.0% | 1907.8 | 66.9 | 0.0428 | 5462.640 | 1147.155 | |
| Separator | 29.0% | 2172.0 | 71.1 | 0.008 | 1235.434 | 358.276 | |

TABLE 2-2

| α | Negative electrode active material layer volume (mm³) | $V_2$ (mm³) |
|---|---|---|
| 11% | 7321.731 | 805.390 |

TABLE 2-3

| Battery part | First cycle efficiency | β | Volume (mm³) | Volume consumed in formation (mm³) | $V_3$ (mm³) |
|---|---|---|---|---|---|
| Negative electrode active material layer | 92.0% | 0.4 | 7321.731 | 585.738 | 365.399 |
| Positive electrode active material layer | 94.0% | | 5462.640 | 327.759 | |

TABLE 2-4

| Battery part | $m_c$ (g) | $V_4$ (mm³) |
|---|---|---|
| Battery | 0.15 | 130.434 |

TABLE 2-5

| $V_1 + V_2 + V_3 + V_4$ (mm³) | $\rho_{El}$ (g/cm³) | $M_{El}$ (g) |
|---|---|---|
| 5222.394 | 1.15 | 6.00 |

The electrolyte was injected into the battery according to the determined injection mass $M_{El}$. In the electrolyte, a mass percentage of the cyclic carbonate compound was 68%, a mass percentage of the linear ester compound was 30%, and a mass percentage of the nitrile compound was 2%. The cyclic carbonate compound included ethylene carbonate, propylene carbonate, and diethyl carbonate (in a mass ratio of 1:1:2), and the linear ester compounds included propyl propionate and ethyl propionate (in a mass ratio of 1:2), and the nitrile compound was succinonitrile.

A 45° C. cycling test was performed on the battery by using the following method:

Charging Mode:

The battery was charged at a constant current of 1.65 C to 4.1 V, then charged at a constant voltage to a current of 1.5 C, then charged at a constant current of 1.5 C to a voltage of 4.25 V, then charged at a constant voltage to a current of 1.2 C, then charged at a constant current of 1.2 C to a voltage of 4.3 V, then charged at a constant voltage to a current of 0.7 C, then charged at a constant current of 0.7 C to a voltage of 4.43 V, and then charged at a constant voltage to a current of 0.025 C.

Discharging Mode:

In each cycle, the battery was discharged at 0.7 C to a voltage of 3.0 V.

During the cycling, a micrometer was used to measure thicknesses of the fully charged battery in the $1^{st}$, $50^{th}$, $100^{th}$, $150^{th}$, $200^{th}$, . . . , and $1000^{th}$ cycling tests.

Figure 3:
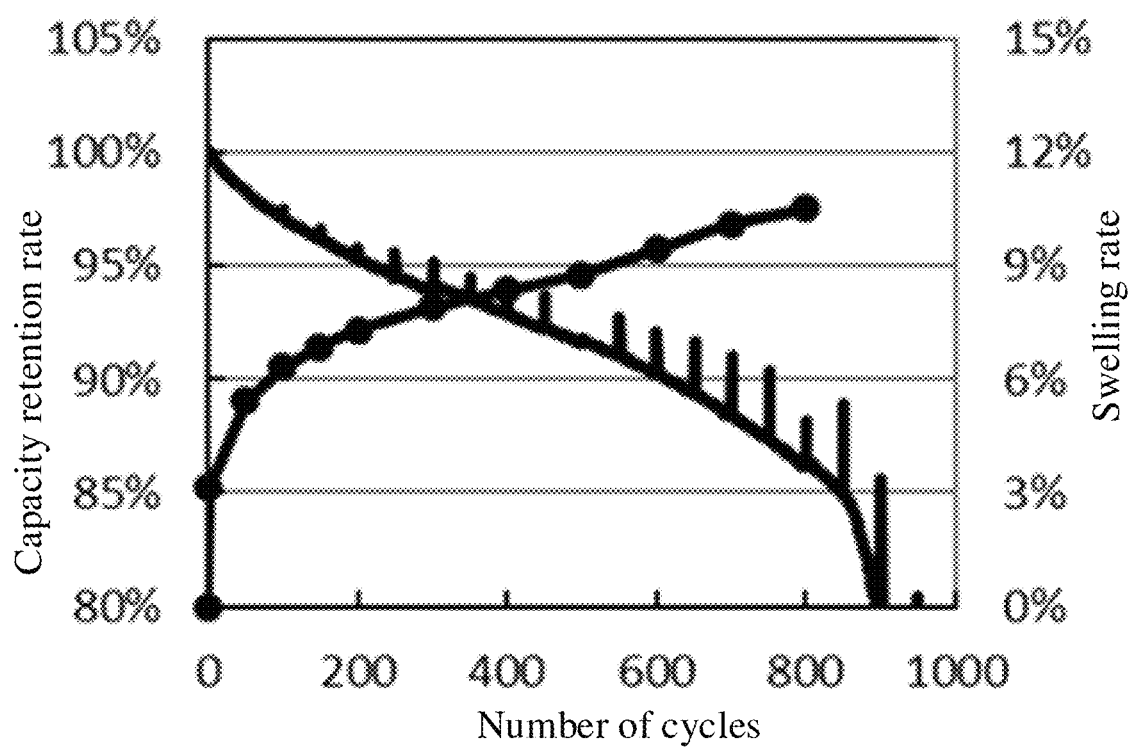
FIG. 3 shows a performance test result of a battery at 45° C. in Example 2 of this application.

Cycling test results of the battery at 45° C. are shown in FIG. 3.

Example 3

Battery dimensions: 3.956 mm (thickness)×44.74 mm (width)×101.75 mm (length); cut-off voltage: 4.35 V; and battery capacity: 2946 mAh.

During the preparation of the battery, the preparation processes of <Preparation of a positive electrode plate>, <Preparation of a negative electrode plate>, and <Preparation of a separator> were the same as those in Example 1.

Parameters and calculation results of the injection mass of electrolyte are shown in Table 3-1 to Table 3-5

TABLE 3-1

| Battery part | Porosity | Length (mm) | Width (mm) | Thickness (mm) | Volume (mm³) | Pore volume (mm³) | $V_1$ (mm³) |
|---|---|---|---|---|---|---|---|
| Negative electrode active material layer | 33.0% | 1091.2 | 78.0327 | 0.06 | 5108.955 | 1685.955 | 2756.369 |

TABLE 3-1-continued

| Battery part | Porosity | Length (mm) | Width (mm) | Thickness (mm) | Volume (mm³) | Pore volume (mm³) | $V_1$ (mm³) |
|---|---|---|---|---|---|---|---|
| Positive electrode active material layer | 21.0% | 1075.3 | 76.8413 | 0.044 | 3635.608 | 763.477 | |
| Separator | 29.0% | 1311 | 80.7327 | 0.01 | 1058.405 | 306.937 | |

TABLE 3-2

| α | Negative electrode active material layer volume (mm³) | $V_2$ (mm³) |
|---|---|---|
| 11% | 5108.955 | 561.985 |

TABLE 3-3

| Battery part | First cycle efficiency | β | Volume (mm³) | Volume consumed in formation (mm³) | $V_3$ (mm³) |
|---|---|---|---|---|---|
| Negative electrode active material layer | 91.8% | 0.5 | 5108.955 | 418.934 | 316.717 |
| Positive electrode active material layer | 94.1% | | 3635.608 | 214.501 | |

TABLE 3-4

| Battery part | $m_c$ (g) | $V_4$ (mm³) |
|---|---|---|
| Battery | 0.15 | 130.434 |

TABLE 3-5

| $V_1 + V_2 + V_3 + V_4$ (mm³) | $\rho_{El}$ (g/cm³) | $M_{El}$ (g) |
|---|---|---|
| 3765.505 | 1.15 | 4.33 |

The electrolyte was injected into the battery according to the determined injection mass $M_{El}$. In the electrolyte, a mass percentage of the cyclic carbonate compound was 70%, a mass percentage of the linear ester compound was 15%, and a mass percentage of the nitrile compound was 15%. The cyclic carbonate compound included ethylene carbonate, propylene carbonate, and diethyl carbonate (in a mass ratio of 1:1:1), and the linear ester compounds included propyl propionate and ethyl propionate (in a mass ratio of 1:1), and the nitrile compound was adiponitrile.

A 45° C. cycling test was performed on the battery by using the following method:

Charging Mode:

The battery was charged at a constant current of 1.1 C to 4.05 V, then charged at a constant voltage to a current of 1.0 C, then charged at a constant current of 1.0 C to a voltage of 4.1 V, then charged at a constant voltage to a current of 0.7 C, then charged at a constant current of 0.7 C to a voltage of 4.2 V, then charged at a constant voltage to a current of 0.4 C, then charged at a constant current of 0.4 C to a voltage of 4.35 V, and then charged at a constant voltage to a current of 0.025 C.

Discharging Mode:

In the $1^{st}$, $49^{th}$, $99^{th}$, $149^{th}$, $199^{th}$, $249^{th}$, . . . , and $999^{th}$ cycles, the battery was discharged at 0.2 C to a voltage of 3.0 V.

In the 2nd to $48^{th}$, $50^{th}$ to $98^{th}$, $100^{th}$ to $148^{th}$, $150^{th}$ to $198^{th}$, . . . , $950^{th}$ to $998^{th}$, and $1000^{th}$ cycles, the battery was discharged at 0.5 C to a voltage of 3.2 V.

During the cycling, a micrometer was used to measure thicknesses of the fully charged battery in the $1^{st}$, $50^{th}$, $100^{th}$, $150^{th}$, $200^{th}$, . . . , and $1000^{th}$ cycling tests.

Figure 4:
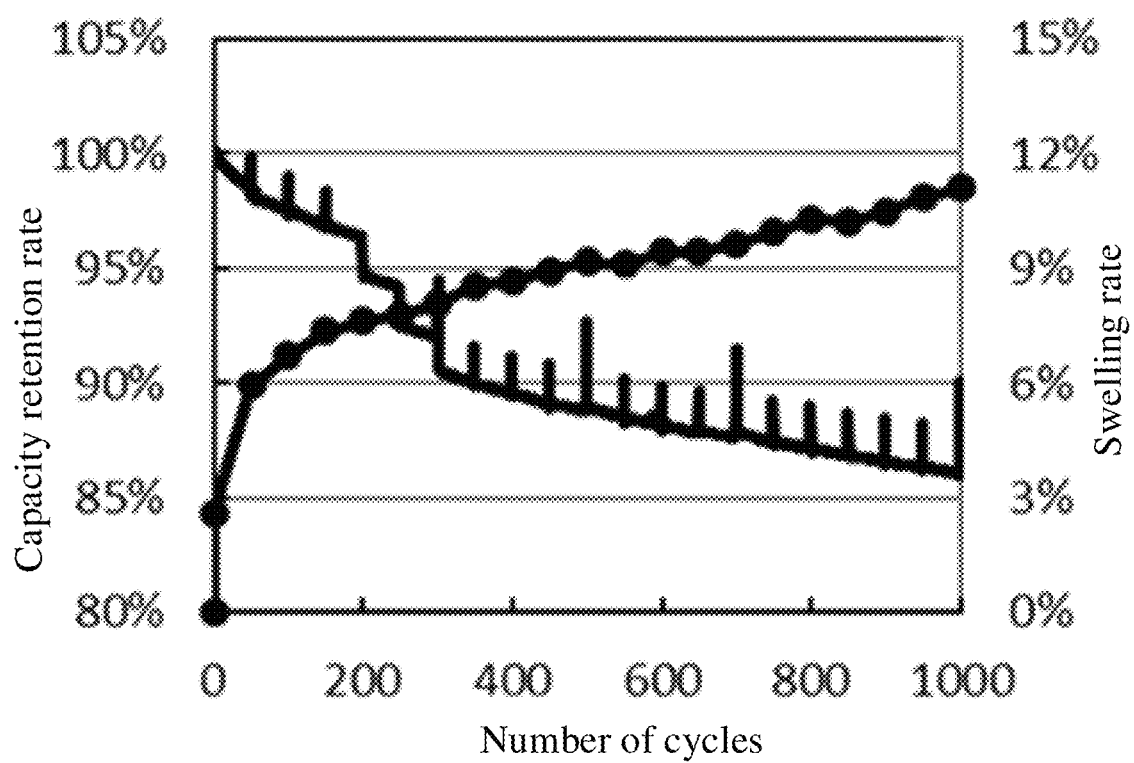
FIG. 4 shows a performance test result of a battery at 45° C. in Example 3 of this application.

Cycling test results of the battery at 45° C. are shown in FIG. 4.

Comparative Example 1

Battery dimensions, a model, a cut-off voltage, and a battery capacity were all the same as those in Example 1.

The electrolyte with the same compositions as Example 1 was used, and the electrolyte was injected according to a gradient with the following five values of injection mass: 4.8 g, 4.7 g, 4.6 g, 4.5 g, and 4.4 g.

Figure 5:
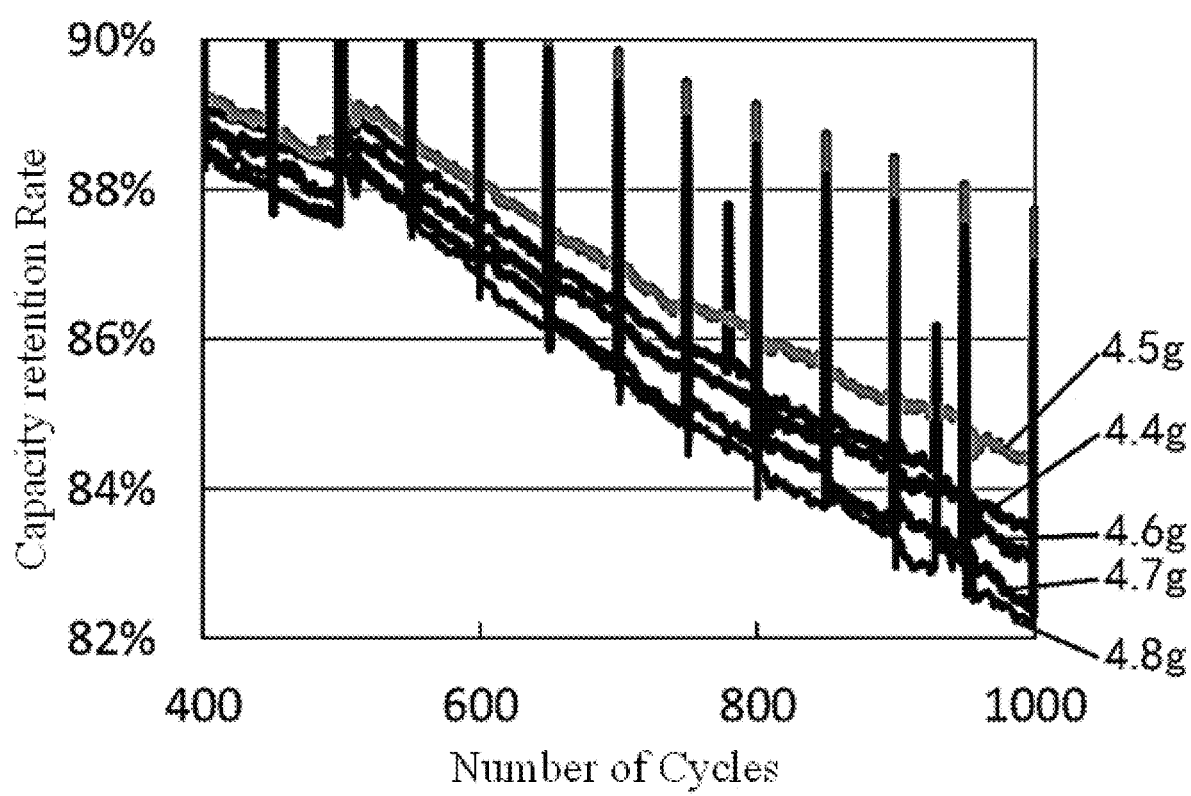
FIG. 5 shows a performance test result of a battery at 25° C. in Comparative Example 1 of this application.

According to the same cycling test method as that in Example 1, cycling tests were performed on the battery with the above five injection mass gradients at a temperature of 25° C., and test results are shown in FIG. 5.

Comparative Example 2

Battery dimensions, a model, a cut-off voltage, and a battery capacity were all the same as those in Example 2.

The electrolyte with the same compositions as Example 2 was used, and the electrolyte was injected according to a gradient with the following seven values of injection mass: 5.3 g, 5.55 g, 5.8 g, 5.9 g, 6.05 g, 6.3 g, and 6.4 g.

Figure 6:
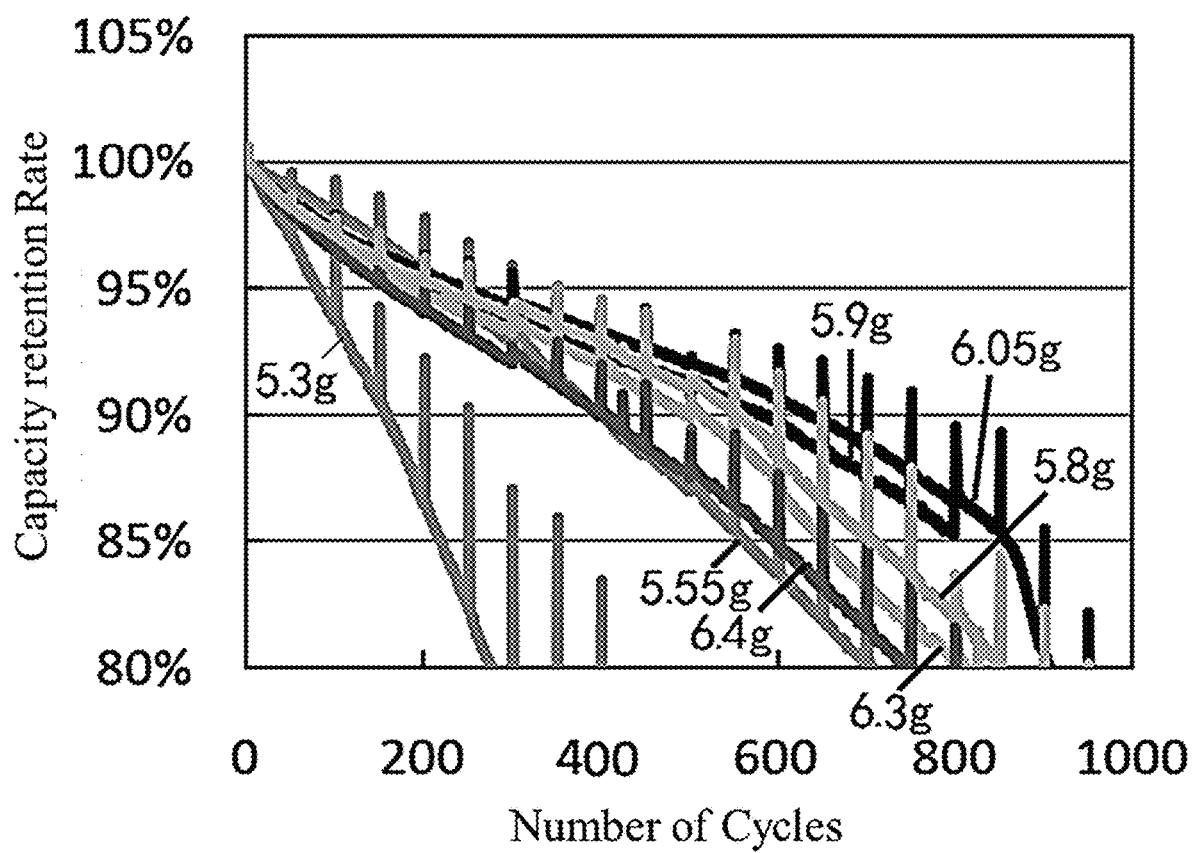
FIG. 6 shows a performance test result of a battery at 45° C. in Comparative Example 2 of this application.

According to the same cycling test method as that in Example 2, cycling tests were performed on the batteries with the foregoing gradient with the seven values of injection mass at a temperature of 45° C., and test results are shown in FIG. 6.

Comparative Example 3

Battery dimensions, a model, a cut-off voltage, and a battery capacity were all the same as those in Example 3.

The electrolyte with the same composition as Example 3 was used, and the electrolyte was injected according to a gradient with the following five values of injection mass: 4.1 g, 4.2 g, 4.3 g, 4.4 g, and 4.5 g.

Figure 7:
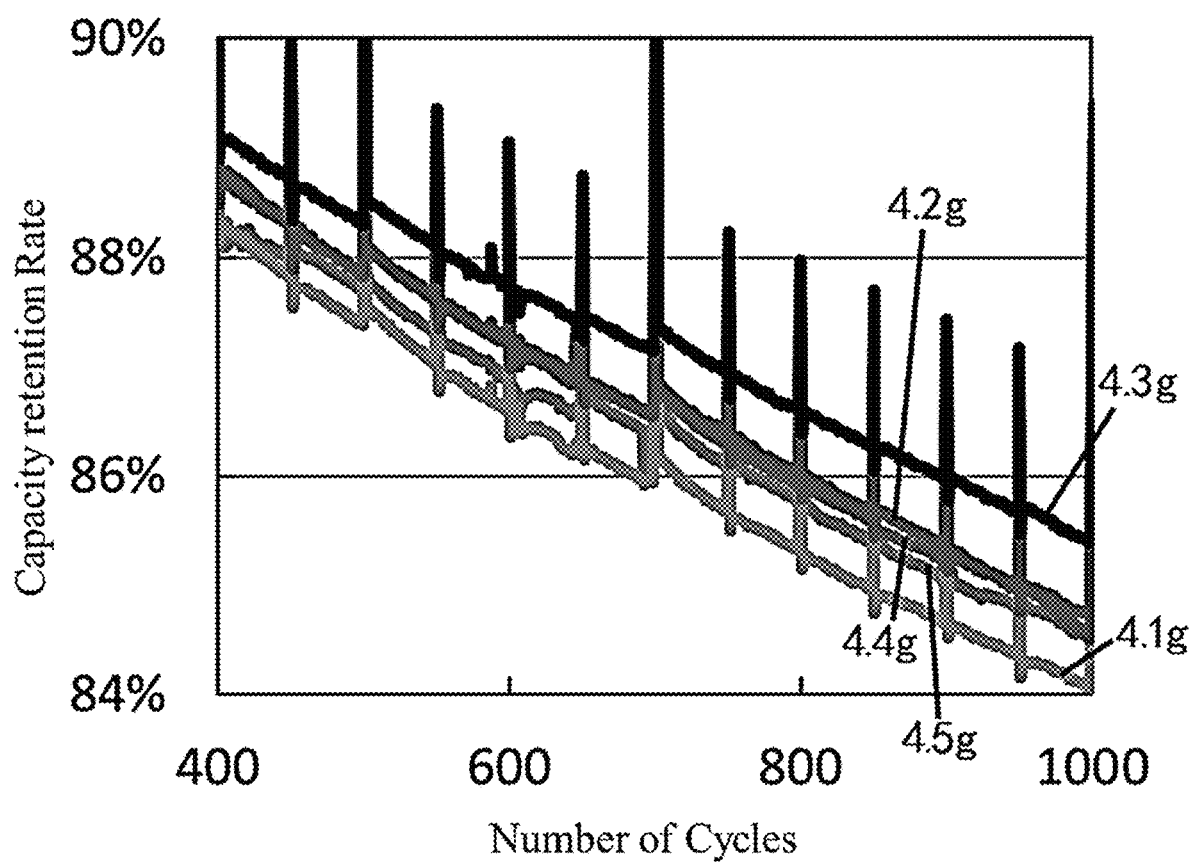
FIG. 7 shows a performance test result of a battery at 45° C. in Comparative Example 3 of this application.

According to the same cycling test method as that in Example 3, cycling tests were performed on the battery with the foregoing gradient with the five values of injection mass at a temperature of 45° C., and test results are shown in FIG. 7.

It can be learned from Example 1 and Comparative Example 1 in combination with FIG. 2 and FIG. 5 that, in the method of Comparative Example 1 for determining the best electrolyte injection mass through the gradient design for the electrolyte, the group with the electrolyte injection mass of 4.5 g had the best battery cycling performance at 25° C., which was very close to the electrolyte injection mass of 4.49 g determined according to the method for determining injection mass of this application, and for the battery cycling performance results at 25° C. obtained in the test, a capacity retention rate after 1000 charge/discharge cycles was the same, indicating that the injection mass determined in this application is consistent with the actual best liquid injection mass, and the accuracy is high.

It can be learned from Example 2 and Comparative Example 2 in combination with FIG. 3 and FIG. 6 that, in the method of Comparative Example 2 for determining the best electrolyte injection mass through the gradient design for the electrolyte, the group with the electrolyte injection mass of 6.05 g had the best battery cycling performance at 45° C., which was very close to the electrolyte injection mass of 6.00 g determined according to the method for determining injection mass of this application, and for battery cycling performance results at 45° C. obtained in the test, a capacity retention rate after 800 charge/discharge cycles was the same, indicating that the injection mass determined in this application is consistent with the actual best liquid injection mass, and the accuracy is high.

It can be learned from Example 3 and Comparative Example 3 in combination with FIG. 4 and FIG. 7 that, in the method of Comparative Example 3 for determining the best electrolyte injection mass through the gradient design for the electrolyte, the group with the electrolyte injection mass of 4.3 g had the best battery cycling performance at 45° C., which was very close to the electrolyte injection mass of 4.33 g determined according to the method for determining injection mass of this application, and for battery cycling performance results at 45° C. obtained in the tests, a capacity retention rate after 800 charge/discharge cycles was relatively large (about 0.6% larger), indicating that the injection mass determined in this application is consistent with the actual best liquid injection mass, and is even more accurate than the electrolyte injection mass determined by using the experimental verification method.

It can be further learned from FIG. 2 to FIG. 4 that as the number of battery charge/discharge cycles increases, a swelling rate of the battery gradually increases.

The foregoing descriptions are merely preferred embodiments of this application and are not intended to limit this application. Any modifications, equivalent substitutions, or improvements made within the spirit and principles of this application shall fall within the claimed scope of this application.

What is claimed is:

1. A method for determining an injection mass of an electrolyte for a battery, the method comprising:

determining a total volume $V_1$ of pores in a positive electrode active material layer of the battery, pores in a negative electrode active material layer of the battery, and pores in a separator of the battery;

determining a volume $V_2$ of the electrolyte required by the negative electrode active material layer to ensure battery cycles, wherein $$V_2 = V_{negative\ electrode\ active\ material\ layer} \times \alpha,$$

$V_{negative\ electrode\ active\ material\ layer}$ is an apparent volume of the negative electrode active material layer, and $\alpha$ is a swelling percentage of the negative electrode active material layer;

determining a volume $V_3$ of the electrolyte consumed by the battery in a formation process, wherein in the formation process, a positive electrode plate and a negative electrode plate in the battery undergo film-forming electrochemical reactions, and the volume $V_3$ is defined as the volume of electrolyte consumed due to the film-forming electrochemical reactions between the electrolyte and a positive electrode active material in the positive electrode plate, and between the electrolyte and a negative electrode active material in the negative electrode plate;

determining a volume $V_4$ of the electrolyte consumed by the battery in an injection process; and determining the injection mass of the electrolyte for the battery: $M_{El}=(V_1+V_2+V_3+V_4)\times\rho_{El}$ $M_{El}$ is the injection mass of the electrolyte for the battery, and $\rho_{El}$ is a density of the electrolyte.

2. The method according to claim 1, wherein $\alpha$ ranges from 5% to 15%.

3. The method according to claim 1, wherein $V_3$ is determined by using the following formula:

$$V_3 = \beta \times [V_{positive\ electrode\ active\ material\ layer} \times (1-A_1) + V_{negative\ electrode\ active\ material\ layer} \times (1-A_2)]$$

wherein $A_1$ is a first cycle efficiency of the positive electrode active material layer, $A_2$ is a first cycle efficiency of the negative electrode active material layer, $\beta$ is a consumption coefficient in the formation process, and $V_{positive\ electrode\ active\ material\ layer}$ is an apparent volume of the positive electrode active material layer.

4. The method according to claim 3, wherein $\beta$ is determined by using the following formula:

$$\beta = \frac{\Delta X}{m_1},$$

wherein $\Delta X$ is a difference between a mass before and a mass after the formation process of the battery, and $m_1$ is a mass of the electrolyte in the battery before the formation process.

5. The method according to claim 1, wherein $V_4$ is determined by using the following formula:

$$V_4 = m_c / \rho_{El},$$

wherein $m_c$ is a mass of the electrolyte consumed by the battery in the injection process.

6. The method according to claim 5, wherein $m_c$ ranges from 0.05 g to 0.6 g.

7. The method according to claim 1, wherein the electrolyte comprises a cyclic carbonate compound, a linear ester compound, and a nitrile compound.

8. The method according to claim 7, wherein the cyclic carbonate compound comprises at least one of ethylene carbonate, propylene carbonate, diethyl carbonate, butylene carbonate, dimethyl carbonate, ethyl methyl carbonate, or methyl propyl carbonate;

the linear ester compound comprises at least one of propyl propionate, ethyl propionate, methyl acetate, ethyl acetate, propyl acetate, methyl propionate, methyl butyrate, ethyl butyrate, γ-butyrolactone, or δ-valerolactone; and the nitrile compound comprises at least one of acetonitrile, succinonitrile, adiponitrile, glutaronitrile, hexanetricarbonitrile, trans-hexenedinitrile, ethylene glycol bis(propionitrile) ether, or hexafluorocyclotriphosphazene.

9. The method according to claim 7, wherein based on a total mass of the electrolyte, a mass percentage of the cyclic carbonate compound ranges from 20% to 70%, a mass percentage of the linear ester compound ranges from 10% to 40%, and a mass percentage of the nitrile compound ranges from 1% to 15%.

10. The method according to claim 9, wherein the cyclic carbonate compound comprises ethylene carbonate, propylene carbonate, and diethyl carbonate; the linear ester compound comprises propyl propionate and ethyl propionate; and the nitrile compound comprises acetonitrile, wherein a mass ratio of the ethylene carbonate to the propylene carbonate to the diethyl carbonate is 1:1:1-2, and a mass ratio of the propyl propionate to the ethyl propionate is 1:1-2.

* * * * *